United States Patent
Li

(10) Patent No.: US 9,785,852 B2
(45) Date of Patent: Oct. 10, 2017

(54) METHOD, TV SET AND SYSTEM FOR RECOGNIZING TV STATION LOGO

(71) Applicant: Xiaomi Inc., Beijing (CN)

(72) Inventor: Jiajia Li, Beijing (CN)

(73) Assignee: XIAOMI INC., Beijing (CN)

( * ) Notice: Subject to any disclaimer, the term of this patent is extended or adjusted under 35 U.S.C. 154(b) by 60 days.

(21) Appl. No.: 14/340,529

(22) Filed: Jul. 24, 2014

(65) Prior Publication Data

US 2015/0125029 A1    May 7, 2015

Related U.S. Application Data

(63) Continuation of application No. PCT/CN2014/077498, filed on May 14, 2014.

(30) Foreign Application Priority Data

Nov. 6, 2013  (CN) .......................... 2013 1 0547631

(51) Int. Cl.
    *G06K 9/20* (2006.01)
    *G06K 9/00* (2006.01)

(52) U.S. Cl.
    CPC ........ *G06K 9/2054* (2013.01); *G06K 9/00711* (2013.01)

(58) Field of Classification Search
    None
    See application file for complete search history.

(56) References Cited

U.S. PATENT DOCUMENTS 5,687,306 A * 11/1997 Blank ................. H04N 1/3873
                                                345/634
5,729,216 A *  3/1998 Sasaki ................... B60Q 9/008
                                                340/903

(Continued)

FOREIGN PATENT DOCUMENTS

CN        101150678 A        3/2008
CN        101739561 A        6/2010

(Continued)

OTHER PUBLICATIONS

Wang, Jinqiao, et al. "A robust method for TV logo tracking in video streams." Multimedia and Expo, 2006 IEEE International Conference on. IEEE, 2006.*

(Continued)

*Primary Examiner* — Michelle Hausmann
(74) *Attorney, Agent, or Firm* — Jun He Law Offices P.C.; James J. Zhu

(57) ABSTRACT

The present disclosure discloses a method, a TV set and a system for recognizing a TV station logo. The method includes: obtaining a TV screen image; for each of a plurality of pre-stored standard TV station logos, selecting a matching area of the standard TV station logo from the TV screen image according to position information of the standard TV station logo, the position information indicating a position of the standard TV station logo in a TV screen; and recognizing a TV station logo in the TV screen image by matching the standard TV station logos with their respective matching areas. The present disclosure reduces the size of the matching area for logo recognition, solves the low speed problem of conventional logo recognition methods due to the selected matching area being large, and brings the effects of reducing the matching area and improving the speed for logo recognition.

13 Claims, 7 Drawing Sheets

(56) References Cited

U.S. PATENT DOCUMENTS

| | | | |
|---|---|---|---|
| 8,019,162 B2* | 9/2011 | Zhang et al. ............... 382/199 |
| 8,175,413 B1 | 5/2012 | Ioffe et al. | |
| 9,058,522 B2* | 6/2015 | Baum et al. | |
| 2003/0149947 A1* | 8/2003 | Sarig ..................... G03F 1/84 382/144 |
| 2004/0177383 A1* | 9/2004 | Martinolich ..... H04N 21/23892 725/138 |
| 2005/0078222 A1* | 4/2005 | Liu .................... H04N 5/147 348/700 |
| 2005/0078223 A1* | 4/2005 | Liu .................... G06K 9/325 348/701 |
| 2009/0244402 A1* | 10/2009 | Rye et al. .................. 348/734 |
| 2009/0278989 A1* | 11/2009 | Bae ........................... 348/625 |
| 2011/0026767 A1* | 2/2011 | Miyazaki ................... 382/103 |
| 2011/0176741 A1* | 7/2011 | Sato et al. ................. 382/238 |
| 2011/0289099 A1 | 11/2011 | Quan | |
| 2012/0131447 A1* | 5/2012 | Park ................ H04N 21/8543 715/239 |
| 2012/0324341 A1 | 12/2012 | Dejean | |
| 2013/0097625 A1* | 4/2013 | Thorwirth et al. ............ 725/25 |
| 2013/0120614 A1* | 5/2013 | Oyama ............... H04N 5/2351 348/234 |

FOREIGN PATENT DOCUMENTS

| | | | |
|---|---|---|---|
| CN | 101895705 A | 11/2010 |
| CN | 101969580 A | 2/2011 |
| CN | 102185878 A | 9/2011 |
| CN | 102289663 A | 12/2011 |
| CN | 102426647 A | 4/2012 |
| CN | 102542297 A | 7/2012 |
| CN | 103020650 A | 4/2013 |
| CN | 103024552 A | 4/2013 |
| CN | 103634652 A | 3/2014 |
| JP | 2007172500 A | 7/2007 |
| JP | 2011517351 A | 6/2011 |
| KR | 1020080040462 A | 5/2008 |
| KR | 20100104371 A | 9/2010 |
| KR | 1020120123995 A | 11/2012 |
| KR | 101591283 B1 | 2/2016 |
| RU | 2001122309 A | 6/2003 |
| WO | 2006/072896 A2 | 7/2006 |
| WO | 2009/073895 A1 | 6/2009 |
| WO | 2012/093407 A2 | 7/2012 |

OTHER PUBLICATIONS

Meisinger, Katrin, et al. "Automatic TV logo removal using statistical based logo detection and frequency selective inpainting." Signal Processing Conference, 2005 13th European. IEEE, 2005.*
Dos Santos, A., and H. Kim. "Real-time opaque and semi-transparent TV logos detection." Proc. 5th Int. Inf. Telecommun. Technol. Symp.. 2007.*
"International Search Report for PCT/CN2014/077498".
Extended European search report for 14191620.5.

* cited by examiner

METHOD, TV SET AND SYSTEM FOR RECOGNIZING TV STATION LOGO

CROSS REFERENCE TO RELATED APPLICATIONS

This application is a Continuation of International Application No. PCT/CN2014/077498 with an international filing date of May 14, 2014, which is based upon and claims priority to Chinese Patent Application No. 201310547631.0, filed on Nov. 6, 2013, the entire contents of which are incorporated herein by reference.

TECHNICAL FIELD

The present disclosure generally relates to image recognition, and more particularly, to a method, a television (TV) set and a system for recognizing a TV station logo.

BACKGROUND

When a television program is shown on a TV set, it is desirable that the TV set can recognize the current channel broadcasting the television program and notify the channel name to the user. Generally, digital TV sets can identify the currently broadcasted channel based on a comparison list provided by a set-top box provider, while analog TVs usually identify the current channel based on a frequency point list. Since the frequency point for a same channel varies across the country, it is very difficult to identify the channel shown by the analog TV set with the frequency point list.

The channel shown by the analog TV set may also be identified through TV station logo recognition. Since each channel has its own unique TV station logo, it is easy to know the channel name after recognizing the TV station logo of the current channel. A conventional method for recognizing TV station logo includes: obtaining a TV screen image, selecting a top quadrant area of the TV screen image as a matching area, then performing a graphic retrieval by substituting all the standard TV station logos pre-stored in a database into the matching area one by one, and finally selecting the standard TV station logo with a highest matching probability according to the matching probabilities obtained by the graphic retrieval as the TV station logo of the current TV channel. The graphic retrieval indicates matching the standard TV station logos in the database with the image in the matching area.

However, nowadays TV screens become larger as well as the selected matching area, which increases the resultant calculation required for the recognition. Thus, the TV station logo recognition according to the above method may be too slow.

SUMMARY

Accordingly, the embodiments of the present disclosure provide a method, a TV set and a system for recognizing TV station logo. The technical solutions are as follows.

According to a first aspect of embodiments of the present disclosure, there is provided a method for recognizing a TV station logo, including: obtaining a TV screen image; for each pre-stored standard TV station logo, selecting a matching area of the standard TV station logo from the TV screen image according to position information of the standard TV station logo, the position information indicating a position of the standard TV station logo in a TV screen; and recognizing a TV station logo in the TV screen image by matching the standard TV station logos with their respective matching areas.

According to a second aspect of embodiments of the present disclosure, there is provided a TV set, including: one or more processors; a TV screen and a memory, wherein the processor is configured to execute instructions for: obtaining a TV screen image; for each of a plurality of pre-stored standard TV station logos, selecting a matching area of the standard TV station logo from the TV screen image according to position information of the standard TV station logo, the position information indicating a position of the standard TV station logo in a TV screen; and recognizing a TV station logo in the TV screen image by matching the standard TV station logos with their respective matching areas.

According to a third aspect of embodiments of the present disclosure, there is provided a system for recognizing TV station logos, including a TV set and a server connected with the TV set, wherein the TV set is the TV set according to the second aspect.

According to a fourth aspect of embodiments of the present disclosure, there is provided a non-transitory computer-readable storage medium having stored therein instructions that, when executed by one or more processors of a TV set, cause the TV set to perform: obtaining a TV screen image; for each of a plurality of pre-stored standard TV station logos, selecting a matching area of the standard TV station logo from the TV screen image according to position information of the standard TV station logo, the position information indicating a position of the standard TV station logo in a TV screen; and recognizing a TV station logo in the TV screen image by matching the standard TV station logos with their respective matching areas.

The technical solutions provided by the embodiments of the present disclosure may have the following advantages.

For the embodiments of the present disclosure, after obtaining the TV screen image, the area corresponding to the position information of the standard logo is selected from the TV screen image according to the position information as the matching area of the standard logo for each pre-stored standard logo. Then the TV station logo in the TV screen image is recognized based on the results of matching respective standard logos with the corresponding matching areas. Such implementation reduces the size of the matching area to substantially the same as the size of the standard logo, thereby solving the problem of low speed logo recognition of the conventional method due to the large size of the matching area selected from the TV screen image. Furthermore, the size of matching area is reduced and the speed for logo recognition is improved for the embodiments of the present disclosure.

It is to be understood that both the foregoing general description and the following detailed description are exemplary and explanatory only and are not restrictive of the invention as claimed.

BRIEF DESCRIPTION OF THE DRAWINGS

In order to explain the embodiments of the present disclosure more clearly, the simple introduction of the drawings used for describing the embodiments will be given below. It is apparent that the accompanying drawings only illustrate some embodiments of the present disclosure, and other drawings may be obtained by the person skilled in the art according to these drawings without inventive labor.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art with reference to particular embodiments.

DETAILED DESCRIPTION

In order to make the purposes, the technical solutions and the advantages of the present disclosure more apparent, the present disclosure will be further described in detail with reference to the accompanying drawings. It is apparent that the described embodiments are only a part of embodiments of the present disclosure, but not all the embodiments. Based on the embodiments in the present disclosure, all the other embodiments obtained by the person skilled in the art without inventive labor will fall within the protection scope of the present disclosure.

Figure 1:
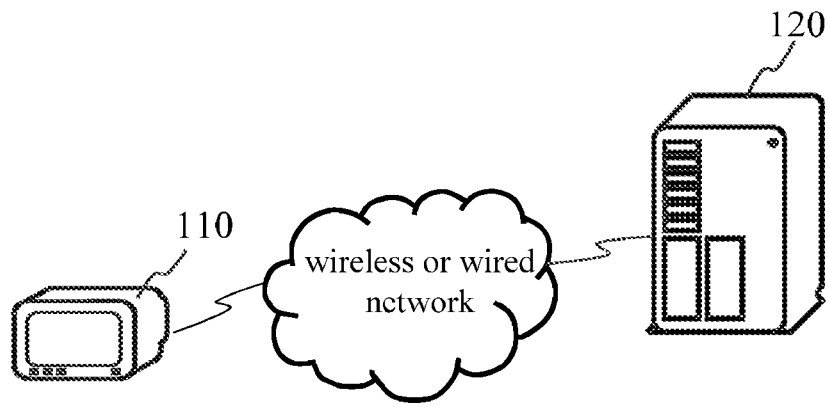
FIG. 1 is an exemplary block diagram of an application environment for applying a method for recognizing TV station logos according to an embodiment of the present disclosure.

Referring to FIG. 1, which illustrates an exemplary block diagram of an application environment for applying a method for a recognizing TV station logo according to an embodiment of the present disclosure. The application environment includes a TV set 110 and a server 120.

In an exemplary embodiment, the TV set 110 can be an analog TV set. However, the present disclosure does not limit the TV set as the analog TV set. Instead, those of skill in the art will recognize that the techniques described herein also support digital TV sets or other electronic devices which can be functioned as a TV set.

The TV set 110 is coupled to the server 120 via a wired network or a wireless network.

The server 120 may be a single server, or a server group consisted of several servers, or a cloud computing service center. A standard TV station logo (hereinafter "standard logo") database is included in the server 120, which stores basic information of a plurality of standard logos. The plurality of standard logos corresponds to a plurality of TV stations or channels. The basic information for each standard logo includes feature information of the standard logo, and position information of the standard logos. The feature information of the standard logo includes information for differentiate the standard logo from other logos, such as an image of the standard logo. In some examples, the basic information may further include at least one selected from the group consisting of a matching threshold value of the standard logo, and a channel name or a channel network ID (Identity) corresponding to the standard logo.

Figure 2:
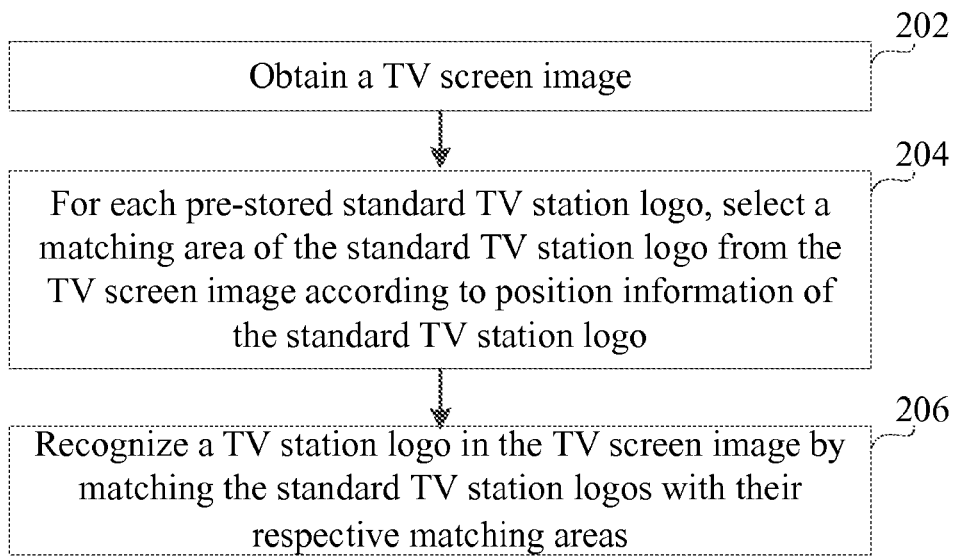
FIG. 2 is an exemplary flow chart of a method for recognizing TV station logos according to an embodiment of the present disclosure.

Referring to FIG. 2, which illustrates an exemplary flow chart of a method for a recognizing TV station logo according to an embodiment of the present disclosure. The method for recognizing the TV station logo can be implemented at the TV set side of the application environment shown in FIG. 1. The method for recognizing the TV station logo may include the following steps.

In Step 202, a TV screen image is obtained.

In Step 204, for each of the plurality of pre-stored standard logos, a matching area of the standard logo is selected from the TV screen image according to position information of the standard logo. The position information is a position of the standard logo in the TV screen.

In Step 206, a TV station logo in the TV screen image is recognized by matching the standard logos with their respective matching areas.

In summary, for the method for recognizing TV station logos according to the embodiment of the disclosure, after obtaining the TV screen image, the area corresponding to the position information of the standard logo is selected from the TV screen image according to the position information as the matching area of the standard logo for each pre-stored standard logo. Then the logo in the TV screen image is recognized based on the result of matching respective standard logos with the corresponding matching areas. Such implementation reduces the size of the matching area to substantially the same as the size of the standard logo, thereby solving the problem of low speed logo recognition for the conventional method due to the large size of the matching area selected from the TV screen image. Furthermore, the size of matching area is reduced and the speed for logo recognition is improved.

Figure 3A:
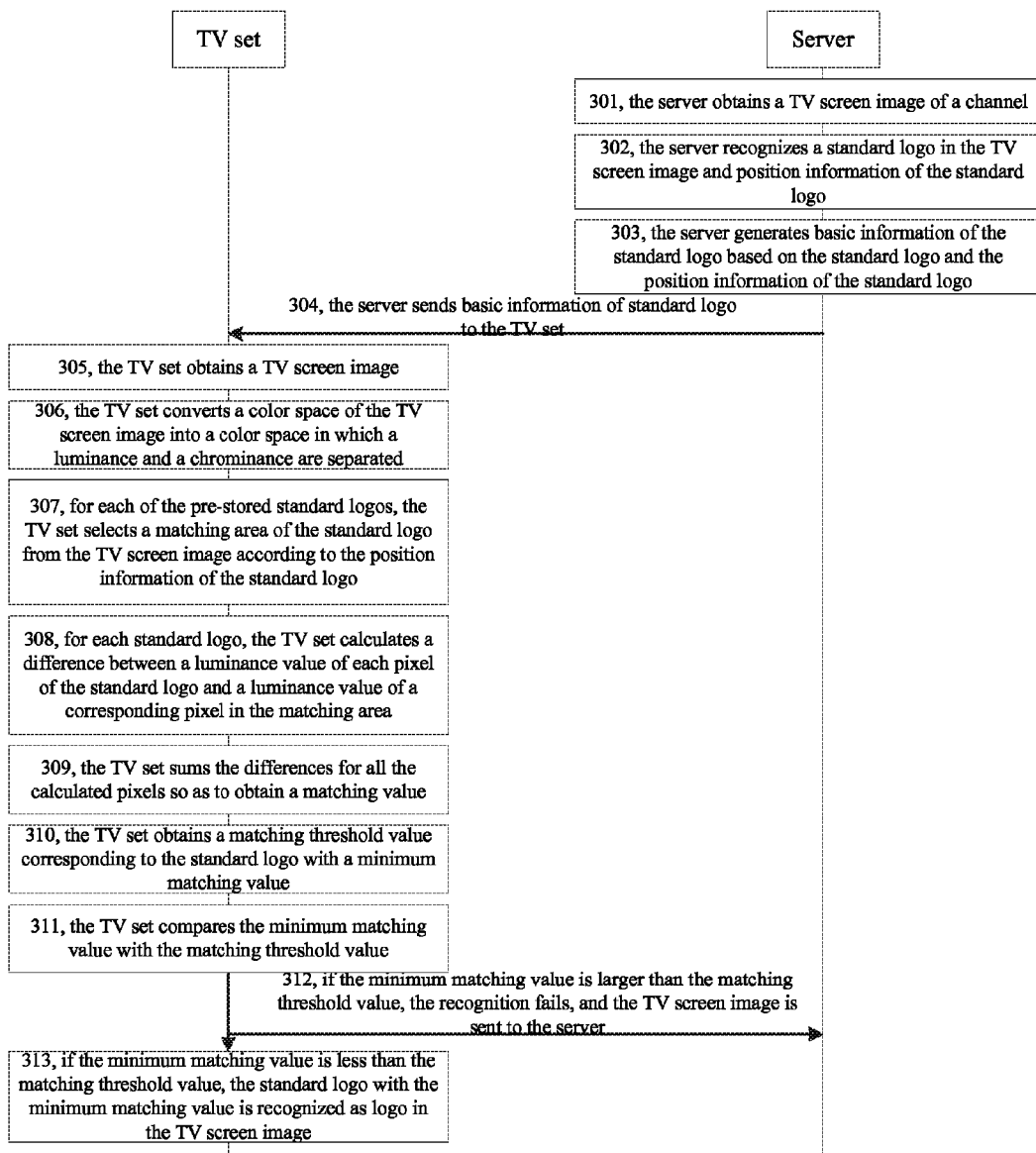
FIG. 3A is an exemplary flow chart of a method for recognizing TV station logos according to another embodiment of the present disclosure.

Referring to FIG. 3A, which illustrates an exemplary flow chart of a method for recognizing a TV station logo according to another embodiment of the present disclosure. The method for recognizing the TV station logo can be applied in the application environment shown in FIG. 1. The method for recognizing the TV station logo may include the following steps.

In Step 301, the server obtains a TV screen image of a channel.

The server may obtain the TV screen image of the channel by two ways. The first way is to obtain the TV screen image of the channel by itself from the Internet or a TV service provider. The second way is to receive the TV screen image from the TV set side if the TV set can not recognize the TV station logo in the TV screen image.

In Step 302, the server recognizes a standard logo in the TV screen image and position information of the standard logo.

The server recognizes the standard logo in the TV screen image and obtains position information of the standard logo according to a control instruction input by technician and the pre-stored standard logos. The standard logos pre-stored in the server may be obtained by downloading the standard logos from the Internet in advance, classifying the standard logos and determining the size of each standard logo by the technician, and then storing them in the server.

Figure 3B:
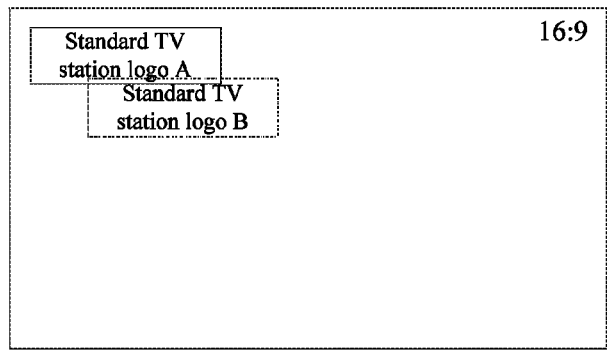
FIGS. 3B and 3C are exemplary positions of standard TV station logos used in the method for recognizing TV station logos according to an embodiment of the present disclosure.
Figure 3C:
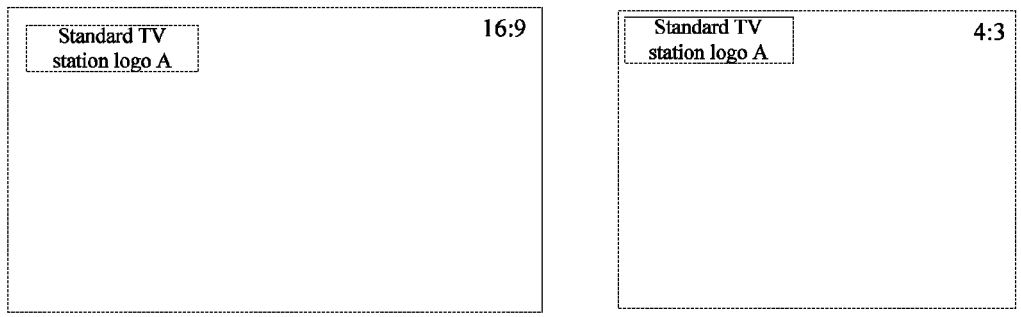

The position information of the standard logo is the position of the standard logo in a TV screen image. The standard logos of different channels have different positions in the TV screen with the same size and the same aspect ratio. As shown in FIG. 3B, the position of standard logo A is upper left to the position of standard logo B. In addition, the same standard logo has different positions in TV screens with different sizes or different aspect ratios. As shown in FIG. 3C, the position of standard logo A in a 16:9 TV screen is different from that in a 4:3 TV screen.

Specifically, Step 302 includes the following sub-steps.

First, a coordinate system is established.

Figure 3D:
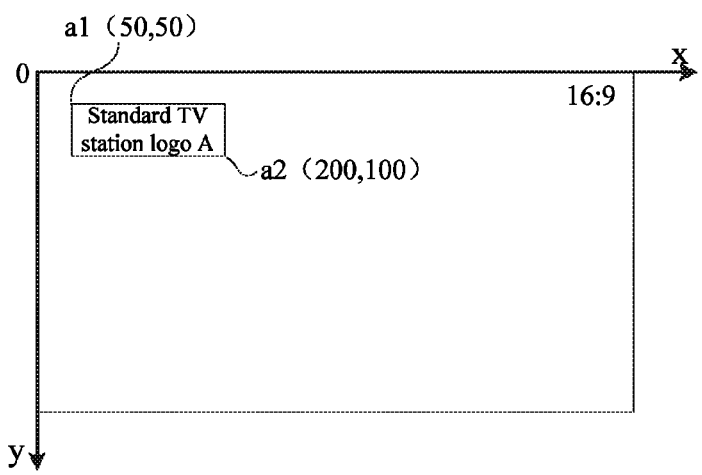
FIG. 3D illustrates how to obtain position information of a matching area in the method for recognizing TV station logos according to an embodiment of the present disclosure.

As shown in FIG. 3D, a coordinate system is established by taking an upper-left corner of the TV screen as the origin of the coordinate system, and taking two adjacent sides of the upper-left corner as two coordinate axes of the coordinate system, wherein the length of a pixel is taken as a unit length.

Second, position information of each standard logo is read in the coordinate system.

As shown in FIG. 3D, two vertices, i.e., an upper-left corner and a lower-right corner of the standard logo are selected as two feature points. Assuming that the coordinate of the feature point a1 at the upper-left corner is (50, 50) and the coordinate of the feature point a2 at the lower-right corner is (200, 100), the coordinates of the feature points a1 and a2 are obtained and stored as the position information of the standard logo.

In some cases, two other vertices, i.e., a lower-left corner and an upper-right corner of the standard logo A may alternatively be selected as two feature points. Or four vertices, i.e., the upper-left, lower-left, upper-right and lower-right corners of the standard logo A may be selected as four feature points. In addition, the position information can also be represented by an upper-left corner of the standard logo A and the length and width of the standard logo A. In short, there are a variety of ways for representing the position information of the standard logo, as long as the specific position of the standard logo in the TV screen can be represented. The present disclosure is not limited thereto.

In Step 303, the server generates basic information of the standard logo based on the image of the standard logo and the position information of the standard logo.

The basic information of each standard logo includes the image of the standard logo and the position information of the standard logo. The image of the standard logo is associated with the position information of the standard logo. In the embodiments of the present disclosure, the feature information of the standard logo refers to logo graphic of the standard logo.

In Step 304, the server sends the basic information of the standard logo to the TV set.

When communicatively coupled to the server, the TV set may download the basic information of the standard logo from the server, and store the downloaded basic information of the standard logo to a local logo database.

Correspondingly, the TV set receives the basic information of the standard logo sent from the server.

In Step 305, the TV set obtains a TV screen image.

When the user searches TV channels or changes the TV channel, the TV set automatically captures the TV screen image of the current channel shown in the TV set. There are many ways to capture the TV screen image. For example, the TV signal processed by the TV set can be obtained through a third-party application or certain script, and then the TV screen image at a certain moment can be captured from a series of consecutive screen images of the TV signal.

In Step 306, the TV converts a color space of the TV screen image into a converted color space in which a luminance and a chrominance of the TV screen image are separated.

Typically, the color space of the original TV screen image is RGB (the color space represented by a tricolor model of a red, green, and blue). In order to eliminate the influence of mixing the luminance and chrominance, the color space of the TV screen image needs to be converted from the RGB color space to the color space in which the luminance and the chrominance of the TV screen image are separated. In TV applications, the YUV color space can usually be used, wherein, Y represents a luminance signal, and U and V represent chrominance signals, respectively. The YUV color space is used due to its luminance signal Y and chrominance signals U, V being separated. For the method for recognizing TV station logos according to the present embodiment, the logo recognition is achieved by calculating and comparing the magnitudes of the luminance signal Y, thus the recognition accuracy is high. The magnitude of the luminance signal Y ranges from 0 to 255, wherein the Y value of black is 0, and the Y value of white is 255.

In Step 307, for each of the pre-stored standard logos, the TV selects a matching area of the standard logo from the TV screen image according to position information of the standard logo.

The present embodiment is exemplified by using an example in which a standard logo pre-stored by the TV set has only a piece of position information. Specifically, assuming that the position information of standard logo A has two feature points (50, 50) and (200, 100), then the point having a coordinate (50, 50) in the TV screen image is selected as an upper-left corner vertex of the matching area of the standard logo A, the other point having a coordinate (200, 100) in the TV screen image is selected as a lower-right corner vertex of the matching area of the standard logo A, and a rectangular area defined by the upper-left corner vertex (50, 50) and the lower-right corner vertex (200, 100) is used as the matching area of standard logo A. Assuming that the position information of a standard logo B has two feature points (80, 65) and (230, 115), then the point having a coordinate (80, 65) in the TV screen image is selected as an upper-left corner vertex of the matching area of the standard logo B, the other point having a coordinate (230, 115) in the TV screen image is selected as a lower-right corner vertex of the matching area of standard logo B, and a rectangular area defined by the upper-left corner vertex and the lower-right corner vertex is used as the matching area of standard logo B.

Further, in some cases a standard logo has two or more pieces of position information corresponding to different screen aspect ratios, respectively. As described in above Step 302, the same standard logo has different positions in the TV screens with different sizes or different aspect ratios. Therefore, when there are two or more pieces of position information for the same standard logo pre-stored in the TV set, the TV set needs to obtain the screen aspect ratio of the TV screen image, and then selects the matching area of the standard logo from the TV screen image according to the position information of the standard logo corresponding to the obtained screen aspect ratio of the TV screen image.

In Step 308, for each standard logo, the TV set calculates a difference between a luminance value of each pixel of the standard logo and a luminance value of a corresponding pixel in the matching area.

Before Step 308, the TV also needs to convert the color space of the standard logo downloaded from the server into the converted color space in which the luminance and the chrominance are separated. If the color space of the TV screen image is converted into the YUV color space in Step 306, it is also needed to convert the color space of each standard logo into the YUV color space. In some examples, in order to reduce the calculation amount at the TV set side and improve the recognition speed, the step for converting the color space of each standard logo into the converted color space in which the luminance and the chrominance are separated is generally executed by the server. Then the TV set may directly download the converted standard logos from the server.

For each standard logo, the TV set calculates the difference between the luminance value of each pixel of the standard logo and the luminance value of the corresponding pixel in the matching area. For example, the luminance value of a certain pixel of standard logo A is 86, and the luminance value of the corresponding pixel in the matching area of the standard logo A is 85, then the difference thereof is 1. Generally, the difference is an absolute value of the value obtained by subtracting the luminance value of the pixel of the standard logo from the luminance value of the pixel of the TV screen image, or vice versa.

Further, in order to reduce the calculation amount and improve the recognition accuracy, Step 308 may include the following sub-steps.

First, for each pixel in the standard logo, the TV set detects whether the luminance value of the pixel is 0.

When selecting and processing each standard logo, the background of the standard logo is generally set black, and the luminance value of the pixel within the black background is 0. Thus, before calculating the difference between the luminance value of each pixel of the standard logo and the luminance value of the corresponding pixel in the matching area, it may be detected whether the luminance value of the pixel is 0. If the luminance value of the pixel is 0, the calculation may not be performed. The calculation is only performed for the portion of the standard logo in which the luminance values of the pixels are not 0, for example, the pixels in the non-background portion of the standard logo may be processed for calculation.

In addition to reducing the calculation amount and improving the recognition speed, this step can also improve the recognition accuracy. Due to existence of noise points, the luminance values between the pixels in the standard logo and those corresponding pixels in the TV screen image are different. Thus, it is preferred to select fewer pixels for calculation, thereby reducing the influence of the error caused by the noise points and improving the recognition accuracy.

Second, if the luminance value of the pixel is not 0, the TV set calculates the difference between the luminance value of the pixel and the luminance value of the corresponding pixel in the matching area of the TV screen image.

This embodiment only performs calculation on the portion of the standard logo in which the luminance values of the pixels is not 0, i.e., only the pixels in the non-background portion of the standard logo are processed for calculation.

In Step 309, the TV set sums the differences for all the calculated pixels so as to obtain a matching value.

In the case that the position information of standard logo A has the feature points (50, 50) and (200, 100), and the unit length of the coordinate is the length of the pixel, then the standard logo A has totally (200−50)×(100−50)=7500 pixels. In the case that there is no black pixel in standard logo A, the matching value is obtained by summing the differences of the luminance values obtained by calculating for the 7500 pixels. It is assumed that the calculated matching value of standard logo A is 30. Further, if there are black pixels in standard logo A, it is necessary to remove such black pixels from the calculation.

In Step 310, the TV set obtains a matching threshold value corresponding to the standard logo with a minimum matching value.

The matching value of the standard logo increasingly depends on the difference between the luminance value of the standard logo and the luminance value of the matching area. Thus, a smaller matching value of the standard logo indicates a higher similarity between the standard logo and the TV station logo in the TV screen image. Therefore, the standard logo with the minimum matching value is most likely the TV station logo in the TV screen image.

However, the standard logo with the minimum matching value is not inevitably the TV station logo in the TV screen image. For example, the TV set does not pre-store the standard logo of a new channel, then it is inappropriate to select the standard logo with the minimum matching value as the TV station logo of the new channel. Thus, Step 310 may include the following sub-steps.

The server provides a matching threshold value for each standard logo, and the matching threshold value is usually around 50-70. For example, a same matching threshold value such as 60 may be set for all the standard logos. However, in order to improve the accuracy of logo recognition, different matching threshold values may be set for different standard logos. The larger the size of the standard logo is, the greater the influence of the noise points is, and the larger the calculated matching values is. Conversely, the smaller the size of the standard logo is, the less the influence of the noise points is, and the smaller the calculated matching values is. Therefore, different matching threshold values may be set for different standard logos based on the size of the standard logos, respectively, and the matching threshold value is positively correlated with the size of the standard logo.

To further validate whether the standard logo with the minimum matching value is the TV station logo in the TV screen image, the TV set obtains the matching threshold value corresponding to the standard logo with the minimum matching value. In addition to the image of the standard logo and the position information of the standard logo, the basic information of the standard logo downloaded from the server may further include the matching threshold value of the standard logo.

In Step 311, the TV set compares the minimum matching value with the matching threshold value.

After obtaining the matching threshold value corresponding to the standard logo with the minimum matching value, the TV set compares the minimum matching value with the matching threshold value.

In Step 312, if the minimum matching value is larger than the matching threshold value, the recognition fails, and the TV screen image is sent to the server.

When the minimum matching value is larger than the matching threshold value of the standard logo corresponding to this matching value, it indicates that the similarity between the matching area and the standard logo corresponding to the minimum matching value is not enough, thereby the standard logo with the minimum matching value is probably not the logo of the current channel shown in the TV set. At this point, it is deemed that a new channel is shown, i.e., the TV set has not pre-stored the standard logo of the new channel. The TV set sends the TV screen image to the server, then the server recognizes the image of the standard logo in the TV screen image and the position information of the standard logo, generates the basic information of the standard logo and send it to the TV set by performing Steps 301-304. Afterwards, the TV set performs Step 305 and the subsequent steps to re-recognize the TV station logo.

In Step 313, if the minimum matching value is less than the matching threshold value, the standard logo with the minimum matching value is recognized as the TV station logo in the TV screen image.

When the minimum matching value is less than the matching threshold value of the standard logo corresponding to this matching value, it indicates that the similarity between the matching area and the standard logo corresponding to the minimum matching value is high, thereby the standard logo with the minimum matching value is deemed as the TV station logo of the current channel shown in the TV set, and the standard logo with the minimum matching value is recognized as the TV station logo in the TV screen image.

Further, after recognizing the TV station logo in the TV screen image, the channel name of the current channel may be obtained according to a relationship between the TV station logo and the channel name.

In summary, for the method for recognizing TV station logos according to the present embodiment, after obtaining the TV screen image, the area corresponding to the position information of the standard logo is selected from the TV screen image according to the position information as the matching area of the standard logo for each pre-stored standard logo. Then the logo in the TV screen image is recognized based on the result of matching respective standard logos with the corresponding matching areas. Such implementation reduces the size of the matching area to substantially the same as the size of the standard logo, thereby solving the problem of low speed logo recognition for the conventional method due to the large size of the matching area selected from the TV screen image. Furthermore, the size of matching area is reduced and the speed for logo recognition is improved.

Also, for the method for recognizing TV station logo according to the present embodiment, the color space in which the luminance and the chrominance are separated, such as YUV color space, is used to calculate the difference between the luminance values of the matching area and the standard logo, so as to realize the logo recognition. This algorithm is simple and has a high accuracy.

Additionally, for the method for recognizing TV station logo according to the present embodiment, it is detected whether the luminance value of the pixel is 0, then only the difference between the luminance value of each pixel in the standard logo in which the background is not 0 and the luminance value of corresponding pixel in the matching area is calculated, which reduces the calculation amount and improves the recognition accuracy.

Furthermore, for the method for recognizing TV station logo according to the present embodiment, the matching threshold value is set for each standard logo, after obtaining the matching value of each standard logo by calculation, the minimum matching value is compared with the matching threshold value. When the minimum matching value is larger than the matching threshold value, the TV screen image is sent to the server and then the server returns basic information of a new standard logo, which solves the problem in the prior art that new logos can not be recognized, and brings the unexpected effect that the new logos can be recognized.

It should be noted that many standard logos have a translucent portion. When calculating the luminance value of such translucent portion of the standard logos, the matching value is relatively large because the matching area is significantly affected by the background of the TV screen image, which may produce errors. Accordingly, the methods according to embodiments of the present disclosure only maintain the opaque portions of the standard logo for each standard logo stored in the server, which improves the recognition accuracy.

Figure 4:
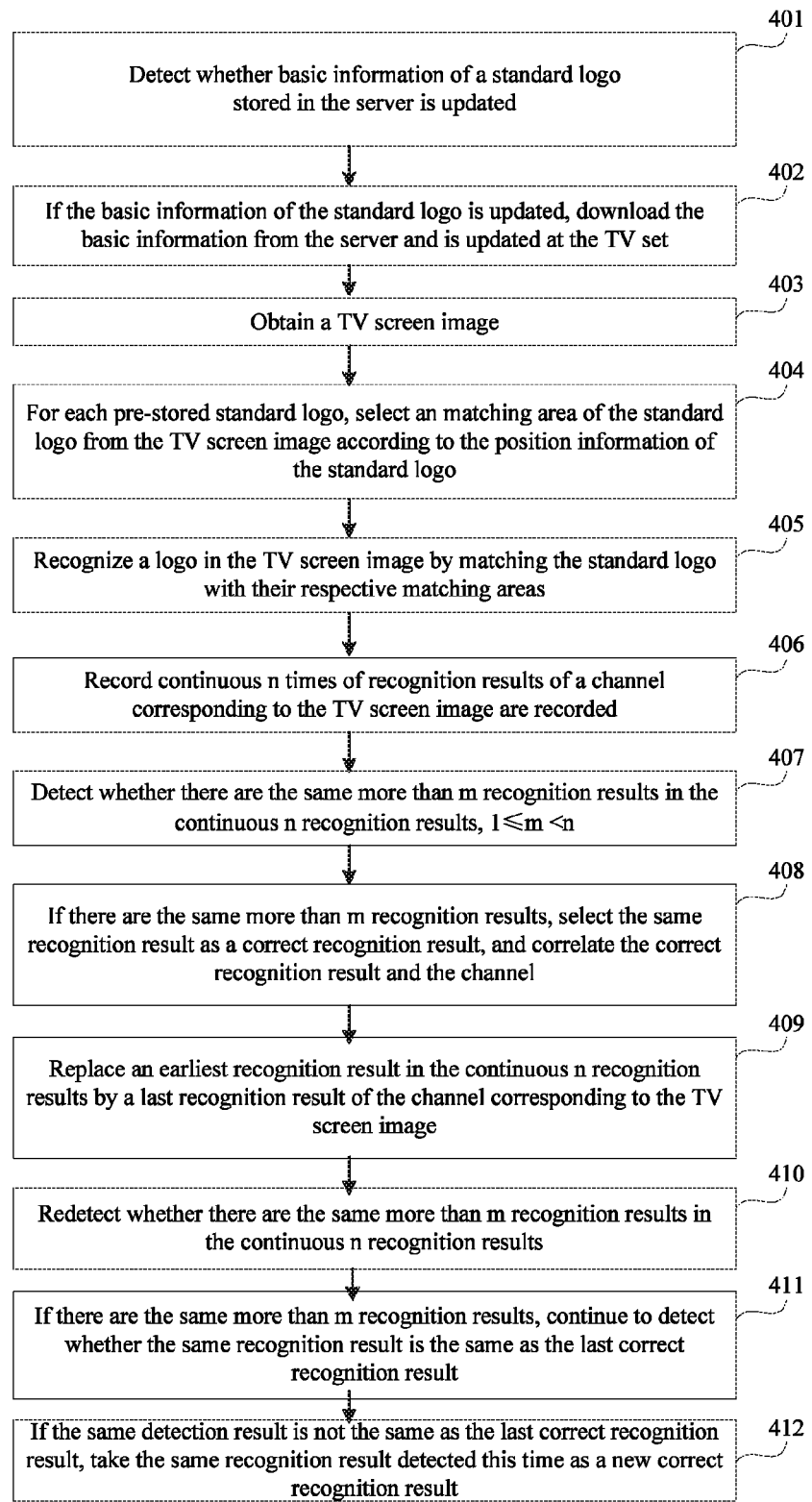
FIG. 4 is an exemplary flow chart of a method for recognizing TV station logos according to another embodiment of the present disclosure.

Refer to FIG. 4, which illustrates an exemplary flow chart of a method for recognizing TV station logo according to another embodiment of the present disclosure. The method for recognizing TV station logo can be implemented at the TV set side of the application environment shown in FIG. 1. The method for recognizing TV station logo may include the following steps.

In Step 401, it is detected whether basic information of a standard logo stored in the server is updated. The basic information includes an image of the standard logo and position information of the standard logo, or further includes a matching threshold value of the standard logo.

In the case that the TV set is communicatively coupled to the server, the TV set logins into the server each time the TV set is turned on, to detect whether the basic information of the standard logo stored in the server is updated. The basic information includes the image of the standard logo, the position information of the standard logo, or further includes the matching threshold value of the standard logo. The use of the matching threshold value for the standard logo is discussed with reference to the embodiment shown in FIG. 3, which will not be elaborated in this embodiment. When it is required to recognize a new TV station logo, the basic information of the standard logo can be downloaded from the server. The basic information includes the image of the standard logo and the position information of the standard logo. The basic information may also include the matching threshold value of the standard logo, and channel name and channel network ID corresponding to the standard logo, etc.

In Step 402, if the basic information of the standard logo is updated, the basic information is downloaded from the server and is updated at the TV set.

Specifically, Step 402 may include the following sub-steps.

First, local region information is sent to the server.

The number and type of the receivable TV channels varies with the receiving region. For example, thirty TV channels can be received in Jiangsu, and fifty TV channels can be received in Beijing. Therefore, in order to reduce the cache occupancy in the TV set and increase the speed of logo recognition, only the basic information of the standard logos corresponding to the TV channels receivable at the local region will be downloaded.

Second, the basic information of at least one standard logo fed back by the server based on the local region information is received.

At the server side, the stored basic information of the standard logos may be pre-classified based on different region information. Then the basic information of the standard logos of the region where the TV set locates is fed back to the TV set.

In Step 403, a TV screen image is obtained.

The TV set obtains the TV screen image when the user searches channels or changes the channel.

In Step 404, for each pre-stored standard logo, a matching area of the standard logo is selected from the TV screen image according to the position information of the standard logo.

In Step 405, a TV station logo in the TV screen image is recognized by matching the standard logos with their respective matching areas.

The process of the above Step 403 to Step 405 can be referred to Steps 305-313 of the method discussed with reference to FIG. 3, which will not be elaborated in this embodiment.

In Step 406, continuous n recognition results of a channel corresponding to the TV screen image are recorded, wherein n>1.

A local cache for recording the recently continuous n recognition results of each channel may be added in the TV set. Assume n is 10. Further, in order to explain more clearly, the channel network ID is used to represent the recognition result. Similar to the standard logo, different channels correspond to different standard logos, channel names and channel network IDs. After recognizing the TV station logo in the TV screen image, the recognition result can be represented by the channel network ID. Thus, information recorded in the local cache may be as shown in Table-1 below.

TABLE 1

| Channel | Recognition result (represented by the channel network ID) | | | | | | | | | |
|---|---|---|---|---|---|---|---|---|---|---|
| | 1 | 2 | 3 | 4 | 5 | 6 | 7 | 8 | 9 | 10 |
| 0 | 5 | 5 | 5 | 5 | 5 | 5 | 6 | 5 | 5 | 5 |
| 1 | 7 | 8 | 8 | 8 | 8 | 8 | 8 | 8 | 8 | 8 |
| 2 | 22 | 22 | 22 | 22 | 22 | 4 | 22 | 22 | 13 | 22 |
| 3 | 54 | 54 | 11 | 54 | 54 | 54 | 54 | 54 | 54 | 54 |
| ... | ... | ... | ... | ... | ... | ... | ... | ... | ... | ... |

In Step 407, whether there are the same more than m recognition results in the continuous n recognition results is detected, wherein $1 \leq m < n$.

When implementing the present invention, an experiment is performed on 30 receivable channels. It is found that, when recognizing any TV screen image using the above Step 403 to Step 405, the recognition accuracy for recognizing TV station logos for any one channel only once is about 80%. If it is desired to improve the recognition accuracy to 99.99% or higher, the recognitions should be repeated for at least seven times. The equation for calculating the recognition accuracy (P) is: $P=1-(1-80\%)^7=99.99\%$.

In this embodiment, n=10 and m=7. In this way, the recognition accuracy can reach 99.99% or higher.

In Step 408, if there are the same more than m recognition results, the same recognition result is selected as a correct recognition result, and the correct recognition result is correlated with the channel.

In the case that n=10 and m=7, when beginning to recognize a TV station logo, it is detected whether there are the same more than 7 recognition results in the continuous 10 recognition results. If there are the same more than 7 recognition results, the same recognition result is selected as the correct recognition result. Also, the correct recognition result is correlated with the channel.

As shown in the above Table-1, a channel network ID corresponding to Channel 0 is 5; a channel network ID corresponding to Channel 1 is 8; a channel network ID corresponding to Channel 2 is 22; a channel network ID corresponding to Channel 3 is 54. The recognition result is represented by the channel network ID.

Specifically, when there are not the same more than m recognition results in the continuous n recognition results, the recognition result may not be correlated with the channel. The recognition result is not correlated with the channel until there are the same more than m recognition results in continuous n recognition results after repeating the recognition for several times. For example, the channel network IDs of Channel 4 in the continuous 10 recognition results are 6, 15, 15, 6, 15, 15, 15, 22, 15 and 15, respectively, thus there are not the same more than 7 recognition results. As there are only a maximum of the same six recognition results. The network channel ID 15 is not correlated with Channel 4, and then proceed with the following Step 409 to Step 412.

In Step 409, an earliest recognition result in the continuous n recognition results is replaced by a latest recognition result of the channel corresponding to the TV screen image.

It is assumed that the 11$^{th}$ recognition result for the TV station logo of Channel 4 is channel network ID 15. Then the earliest recognition result in the continuous 10 recognition results, i.e. 6, is replaced by 15. Thus, the updated latest continuous 10 recognition results are 15, 15, 6, 15, 15, 15, 22, 15, 15 and 15, respectively. The recognition results are updated no matter whether the latest recognition result is the same as the earliest recognition result in the original continuous 10 recognition results.

In Step 410, whether there are the same more than m recognition results in the continuous m recognition results is re-detected.

It is detected whether there are not the same more than 7 recognition results in the continuous 10 recognition results. It is found that there are the same more than 7 recognition results, wherein the channel network ID is 15.

In Step 411, if there are the same more than m recognition results, continue to detect whether the same recognition result is the same as the last correct recognition result.

Generally, when replacing the earliest recognition result in the continuous n recognition results by the latest recognition result consecutively, there are always the same more than m recognition results for a channel, and the same more than m recognition results is the correct recognition result of this channel.

If there are the same more than m recognition results for a certain channel previously, this channel already has the correct recognition result. However, after several subsequent recognitions, the subsequent recognition results are all different from the correct recognition result, then the previous recognition results are replaced by the subsequent recognition results consecutively. When there are the same more than m recognition results again, it is detected whether the same more than m recognition results appeared again is the same as the last correct recognition result.

In Step 412, if the same recognition result is not the same as the last correct recognition result, the same recognition result detected this time is taken as a new correct recognition result.

If the same recognition result is not the same as the last correct recognition result, the same recognition result detected this time is taken as a new correct recognition result instead of the previous correct recognition result of the channel.

To sum up, for the method for recognizing TV station logo according to the present embodiment, after obtaining the TV screen image, the area corresponding to the position information of the standard logo is selected from the TV screen image according to the position information as the matching area of the standard logo for each pre-stored standard logo. Then the logo in the TV screen image is recognized based on the result of matching respective standard logos with the corresponding matching areas. Such implementation reduces the size of the matching area to substantially the same as the size of the standard logo, thereby solving the problem of low speed logo recognition for the conventional method due to the large size of the matching area selected from the TV screen image. Furthermore, the size of matching area is reduced and the speed for logo recognition is improved.

For the method for recognizing TV station logo according to the present embodiment, the continuous n times of the recognition results of the channel corresponding to the TV screen image are recorded, and whether there are the same more than m recognition results in the continuous n recognition results is detected. Also, the same more than m recognition results is selected as the correct recognition result, thereby avoiding the potential recognition error for one-time recognition, and greatly improving the recognition accuracy.

The following are device embodiments of the present disclosure, which are configured to perform the method according to the present disclosure. For details of the device embodiments of the present disclosure which are not disclosed, please refer to the method embodiments of the present disclosure.

Figure 5:
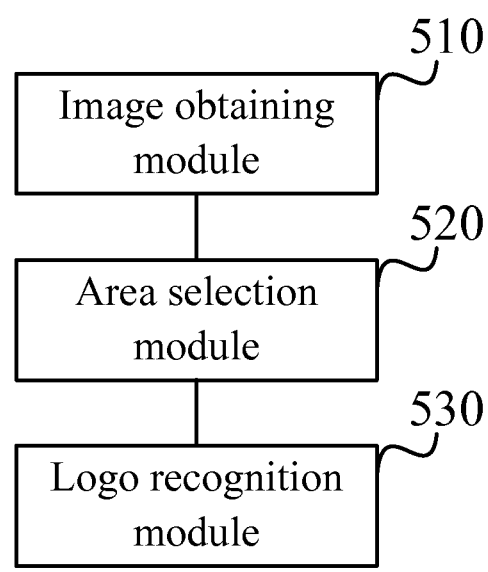
FIG. 5 is an exemplary block diagram of a device for recognizing TV station logos according to an embodiment of the present disclosure.

Referring to FIG. 5, which is an exemplary block diagram of a device for recognizing TV station logo according to an embodiment of the present disclosure. The device for recognizing TV station logo may be integrated within a TV set in form of software, hardware or a combination thereof. The device for recognizing the TV station logo may include an image obtaining module 510, an area selection module 520, and a logo recognition module 530.

The image obtaining module 510 is configured to obtain a TV screen image.

The area selection module 520 is configured to, for each pre-stored standard TV station logo, select a matching area of the standard TV station logo from the TV screen image according to position information of the standard TV station logo, the position information indicating a position of the standard TV station logo in a TV screen.

The logo recognition module 530 is configured to recognize a TV station logo in the TV screen image by matching the standard TV station logos with their respective matching areas.

In summary, for the device for recognizing TV station logo according to the present embodiment, after obtaining the TV screen image, the area corresponding to the position information of the standard logo is selected from the TV screen image according to the position information as the matching area of the standard logo for each pre-stored standard logo. Then the logo in the TV screen image is recognized based on the result of matching respective standard logos with the corresponding matching areas. Such implementation reduces the size of the matching area to substantially the same as the size of the standard logo, thereby solving the problem of low speed logo recognition for the conventional method due to the large size of the matching area selected from the TV screen image. Furthermore, the size of matching area is reduced and the speed for logo recognition is improved.

Figure 6:
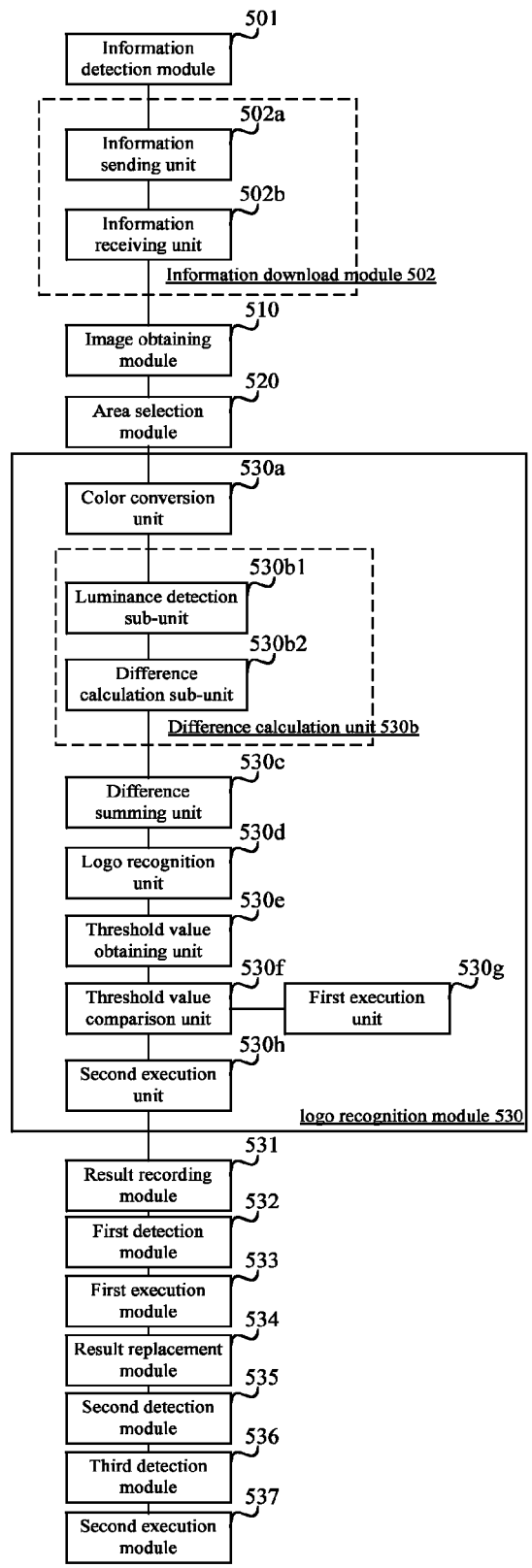
FIG. 6 is an exemplary block diagram of a device for recognizing TV station logos according to another embodiment of the present disclosure.

Referring to FIG. 6, which is an exemplary block diagram of a device for recognizing TV station logo according to another embodiment of the present disclosure. The device for recognizing TV station logos may be integrated within a TV set in form of software, hardware or a combination thereof. The device for recognizing the TV station logo may include an information detection module 501, an information download module 502, an image obtaining module 510, an area selection module 520, and a logo recognition module 530.

The information detection module 501 is configured to detect whether basic information of the standard TV station logo stored in a server is updated, the basic information comprising feature information of the standard TV station logo and the position information of the standard TV station logo, or further comprising a matching threshold value of the standard TV station logo.

The information download module 502 is configured to, if it is detected that the basis information is updated, download the basic information of the standard TV station logo from the server and updating the same.

Specifically, the information download module 502 includes an information sending unit 502*a* and an information receiving unit 502*b*.

The information sending unit 502*a* is configured to send local region information to the server.

The information receiving unit 502*b* is configured to receive the basic information of at least one standard TV station logo from the server, which is provided based on the local region information.

The image obtaining module 510 is configured to obtain a TV screen image.

The area selection module 520 is configured to, for each pre-stored standard TV station logo, select a matching area of the standard TV station logo from the TV screen image according to position information of the standard TV station logo, the position information indicating a position of the standard TV station logo in a TV screen.

The logo recognition module 530 is configured to recognize a TV station logo in the TV screen image by matching the standard TV station logos with their respective matching areas.

In particular, the logo recognition module 530 may include: a color conversion unit 530*a*, a difference calculation unit 530*b*, a difference summing unit 530*c*, and a logo recognition unit 530*d*.

The color conversion unit 530*a* is configured to convert a color space of the TV screen image into a converted color space in which luminance and chrominance of the TV screen image are separated.

The difference calculation unit 530*b* is configured to, for each standard logo, calculate a difference between a luminance value of each pixel of the standard logo and a luminance value of a corresponding pixel in the matching area.

Specifically, the difference calculation unit 530*b* includes: a luminance detection sub-unit 530*b*1 and a difference calculation sub-unit 530*b*2.

The luminance detection sub-unit 530*b*1 is configured to, for each pixel in the standard logo, detect whether a luminance value of the pixel is 0.

The difference calculation sub-unit 530*b*2 is configured to, if the luminance value of the pixel is not 0, calculate the difference between the luminance value of the pixel and the luminance value of the corresponding pixel in the matching area.

The difference summing unit 530*c* is configured to sum the differences for all the calculated pixels in the standard TV station logo so as to obtain a matching value.

The logo recognition unit 530*d* is configured to determine the TV station logo in the TV screen image according to the standard TV station logo with a minimum matching value.

The logo recognition module 530 may further include: a threshold value obtaining unit 530*e*, a threshold value comparison unit 530*f*, a first execution unit 530*g*, and a second execution unit 530*h*.

The threshold value obtaining unit 530*e* is configured to obtain a matching threshold value for the standard TV station logo with the minimum matching value, the matching threshold value being positively correlated with a size of the standard TV station logo.

The threshold value comparison unit 530*f* is configured to compare the minimum matching value with the matching threshold value.

The first execution unit 530*g* is configured to, if the minimum matching value is larger than the matching threshold value, send the TV screen image to a server.

The second execution unit 530*h* is configured to, if the minimum matching value is less than the matching threshold value, use the standard TV station logo with the minimum matching value as the TV station logo in the TV screen image.

A result recording module 531 is configured to record continuous n recognition results of a channel corresponding to the TV screen image, wherein n>1.

A first detection module 532 is configured to detect whether there are the same more than m recognition results in the continuous n recognition results, wherein $1 \leq m < n$.

A first execution module 533 is configured to, if there are the same more than m recognition results, select the same recognition result as a correct recognition result, and correlating the correct recognition result with the channel.

A result replacement module 534 is configured to replace an earliest recognition result in the continuous n recognition results by a latest recognition result of the channel corresponding to the TV screen image.

A second detection module 535 is configured to re-detect whether there are the same more than m recognition results in the continuous n recognition results.

A third detection module 536 is configured to, if there are the same more than m recognition results, continue to detect whether this same recognition result is the same as the last correct recognition result.

A second execution module 537 is configured to, if the same recognition result is not the same as the last correct recognition result, take the same recognition result detected this time as a new correct recognition result.

In summary, for the device for recognizing TV station logo according to the present embodiment, after obtaining the TV screen image, the area corresponding to the position information of the standard logo is selected from the TV screen image according to the position information as the matching area of the standard logo for each pre-stored standard logo. Then the logo in the TV screen image is recognized based on the result of matching respective standard logos with the corresponding matching areas. Such implementation reduces the size of the matching area to substantially the same as the size of the standard logo, thereby solving the problem of low speed logo recognition for the conventional method due to the large size of the matching area selected from the TV screen image. Furthermore, the size of matching area is reduced and the speed for logo recognition is improved.

Also, for the device for recognizing TV station logo according to the present embodiment, the color space in which the luminance and the chrominance are separated, such as YUV color space, is used to calculate the difference between the luminance values of the matching area and the standard logo, so as to realize the logo recognition. This algorithm is simple and has a high accuracy.

Additionally, for the device for recognizing TV station logo according to the present embodiment, it is detected whether the luminance value of the pixel is 0, then only the difference between the luminance value of each pixel in the standard logo in which the background is not 0 and the luminance value of corresponding pixel in the matching area is calculated, which reduces the calculation amount and improves the recognition accuracy.

Furthermore, for the device for recognizing TV station logo according to the present embodiment, the matching threshold value is set for each standard logo, after obtaining the matching value of each standard logo by calculation, the minimum matching value is compared with the matching threshold value. When the minimum matching value is larger than the matching threshold value, the TV screen image is sent to the server and then the server returns basic information of a new standard logo, which solves the problem in the prior art that new logos can not be recognized, and brings the unexpected effect that the new logos can be recognized.

For the device for recognizing TV station logo according to the present embodiment, the continuous n times of the recognition results of the channel corresponding to the TV screen image are recorded, and whether there are the same more than m recognition results in the continuous n recognition results is detected. Also, the same more than m recognition results is selected as the correct recognition result, thereby avoiding the potential recognition error for one-time recognition, and greatly improving the recognition accuracy.

Figure 7:
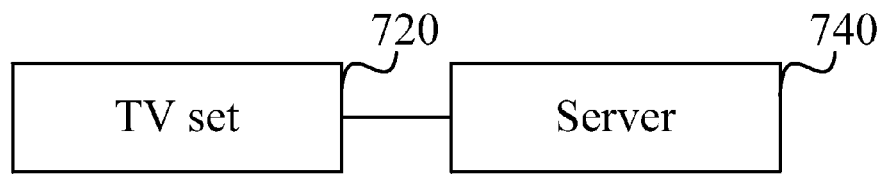
FIG. 7 is an exemplary block diagram of a system for recognizing TV station logos according to an embodiment of the present disclosure.

Referring to FIG. 7, which is an exemplary block diagram of a system for recognizing TV station logo according to an embodiment of the present disclosure. The system for recognizing a logo includes a TV set 720 and a server 740.

The TV set 720 includes the device for recognizing the TV station logo shown in FIG. 5 or FIG. 6. The device for recognizing the TV station logo described above may be integrated within the TV set in form of software, hardware or a combination thereof.

The TV set 720 and the server 740 are communicatively coupled to each other via a wired network or a wireless network.

The server 740 provides basic information of standard logos to the TV set 720.

In summary, for the system for recognizing TV station logo according to the present embodiment, after obtaining the TV screen image, the area corresponding to the position information of the standard logo is selected from the TV screen image according to the position information as the matching area of the standard logo for each pre-stored standard logo. Then the logo in the TV screen image is recognized based on the result of matching respective standard logos with the corresponding matching areas. Such implementation reduces the size of the matching area to substantially the same as the size of the standard logo, thereby solving the problem of low speed logo recognition for the conventional method due to the large size of the matching area selected from the TV screen image. Furthermore, the size of matching area is reduced and the speed for logo recognition is improved.

It should be noted that the device for recognizing the TV station logo according to the above embodiments are only exemplarily divided into the above respective functional modules when used to recognize TV station logos. In applications, the above functions may be implemented by different functional modules according to practical requirements. In other words, the devices may be divided into different functional modules for achieving all or a part of the above described functions. In addition, the device for recognizing the TV station logo according to the above embodiments and the method for recognizing the TV station logo belong to the same concept, and the detailed implementation of the device for recognizing the TV station logo may be referred to the method embodiments.

Another embodiment of the present disclosure provides a TV set which may include: one or more processors; a memory; a TV screen and one or more modules stored in the memory and being configured to be executed by the one or more processors. The processor is configured to execute instructions for: obtaining a TV screen image; for each of a plurality of pre-stored standard TV station logos, selecting a matching area of the standard TV station logo from the TV screen image according to position information of the standard TV station logo, the position information indicating a position of the standard TV station logo in a TV screen; and recognizing a TV station logo in the TV screen image by matching the standard TV station logos with their respective matching areas.

In one exemplary example, recognizing comprises: converting a color space of the TV screen image into a converted color space in which luminance and chrominance of the TV screen image are separated; for each standard TV station logo, calculating a difference between a luminance value of each pixel in the standard TV station logo and a luminance value of a corresponding pixel in the matching area; summing the differences for all the calculated pixels in the standard TV station logo so as to obtain a matching value; and determining the TV station logo in the TV screen image according to the standard TV station logo with a minimum matching value.

In one exemplary example, calculating may further comprises: for each pixel in the standard TV station logo, detecting whether the luminance value of the pixel is 0; and if the luminance value of the pixel is not 0, calculating the difference between the luminance value of the pixel and the luminance value of the corresponding pixel in the matching area.

In one exemplary example, the processor is further configured to execute instructions for: obtaining a matching threshold value for the standard TV station logo with the minimum matching value, the matching threshold value being positively correlated with a size of the standard TV station logo; comparing the minimum matching value with the matching threshold value; if the minimum matching value is larger than the matching threshold value, sending the TV screen image to a server; and if the minimum matching value is less than the matching threshold value, using the standard TV station logo with the minimum matching value as the TV station logo in the TV screen image.

In one exemplary example, the processor is further configured to execute instructions for: detecting whether basic information of the standard TV station logo stored in a server is updated, the basic information comprising feature information of the standard TV station logo and the position information of the standard TV station logo, or further comprising a matching threshold value of the standard TV station logo; and if it is detected that the basis information is updated, downloading the basic information of the standard TV station logo from the server and updating the same.

In one exemplary example, downloading comprises: sending local region information to the server; and receiving the basic information of at least one standard TV station logo from the server, which is provided based on the local region information.

In one exemplary example, wherein the processor is further configured to execute instructions for: recording continuous n recognition results of a channel corresponding to the TV screen image, wherein n>1; detecting whether there are the same more than m recognition results in the continuous n recognition results, wherein $1 \leq m < n$; and if there are the same more than m recognition results, selecting the same recognition result as a correct recognition result, and correlating the correct recognition result with the channel.

In one exemplary example, wherein the processor is further configured to execute instructions for: replacing an earliest recognition result in the continuous n recognition results by a latest recognition result of the channel corresponding to the TV screen image; re-detecting whether there are the same more than m recognition results in the continuous n recognition results; if there are the same more than m recognition results, continuing to detect whether this same recognition result is the same as the last correct recognition result; and if the same recognition result is not the same as the last correct recognition result, taking the same recognition result detected this time as a new correct recognition result.

Yet another embodiment of the present disclosure provides a non-transitory computer-readable storage medium having stored therein instructions that, when executed by one or more processors of the TV set, cause the TV set to perform: obtaining a TV screen image; for each of a plurality of pre-stored standard TV station logos, selecting a matching area of the standard TV station logo from the TV screen image according to position information of the standard TV station logo, the position information indicating a position of the standard TV station logo in a TV screen; and recognizing a TV station logo in the TV screen image by matching the standard TV station logos with their respective matching areas.

Figure 8:
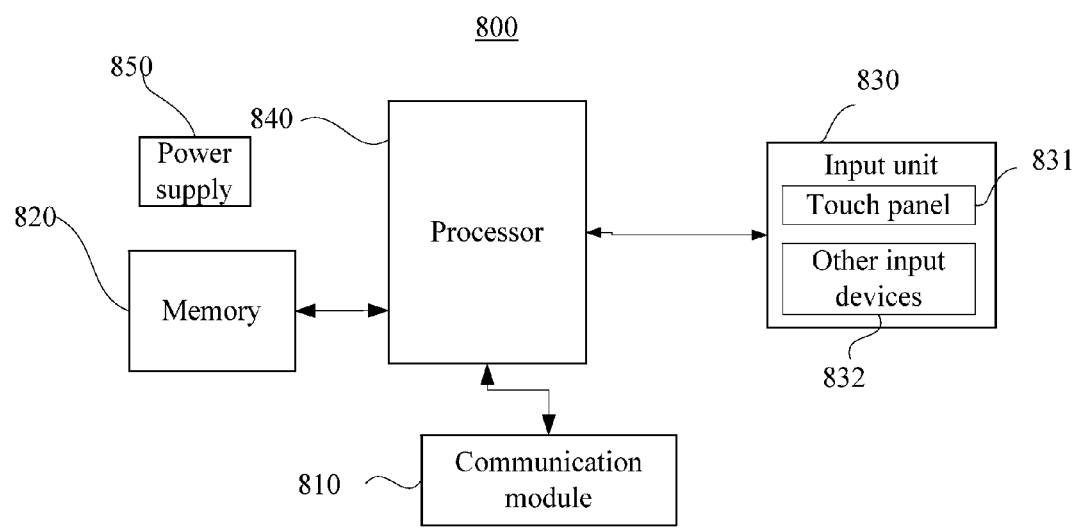
FIG. 8 is an exemplary block diagram of a TV set for applying several embodiments of the present disclosure.

Referring to FIG. 8, which illustrates an exemplary structural diagram of the TV set involved in respective embodiments of the present disclosure, the TV set may implement the method for recognizing a logo provided by the above embodiments. The TV set in the embodiments of the present disclosure may includes one or more of the following constituting parts: a processor for executing computer program instructions to accomplish various procedures and methods, a Random Access Memory (RAM) and a Read-Only Memory (RAM) for storing information and program instructions, a memory for storing data and information, an I/O device, an interface, an antenna, and the like.

The TV set 800 may include a communication module 810, a memory 820 including one or more computer-readable storage mediums, an input unit 830, a processor 840 including one or more processing cores, a power supply 850 and the like. The person skilled in the art could appreciate that the structure of the TV set 800 shown in the drawing does not constitute the limitation to the TV set, but may include more or less components than those shown in the drawing, or may combine some of the components, or may have different arrangement of the components.

The communication module 810 is configured to receive and transmit signals during information receipt and transmission or during a call. Specifically, the communication unit 810 may send the received information to the one or more processors 840 for processing. During actual implementation, the communication module 810 may be a RF circuit, a wireless connection module or a wired connection module. Generally, the RF circuit 810 includes, but is not limited to an antenna, at least one amplifier, a tuner, one or more oscillators, a subscriber identity module (SIM) card, a transceiver, a coupler, a LNA (Low Noise Amplifier), a duplexer, etc. Additionally, the RF circuit 810 may also communicate with network and other devices via wireless communication. The wireless connection module may be a WIFI module or Bluetooth module, which may assist the user to transmit and receive information sent from other TV sets. The wired connection module is a module which may be connected with other TV sets via other connection wires, such as network cable, so as to transmit and receive information.

The memory 820 may be configured to store software programs and modules. The processor 840 performs various functional applications and data processing by executing the software programs and modules stored in the memory 820. The memory 820 may mainly include a program storage region and a data storage region, wherein the program storage region may store an operation system, an application program required by at least one function (such as an audio playing function, an image playback function) and the like; and the data storage region may store the data created according to the usage of the TV set 800 (such as audio data, a phone book) and the like. In addition, the memory 820 may include a high-speed random access memory, and may also include a non-transitory memory, such as at least one disc storage medium, flash device or other transitory solid-state storage medium. Accordingly, the memory 820 may also include a memory controller for providing the processor 840 and the input unit 830 with an access to the memory 820.

The input unit 830 may be configured to receive the input digits or character information, and generate signal inputs of a keyboard, a mouse, a joystick, an optics or a trackball related to the user settings and function control. Particularly, the input unit 830 may include a touch sensitive surface 831 and other input devices 832. The touch sensitive surface 831, which is also referred to as a touch screen or a touch pad, can collect the user's touch operation thereon or thereabout (for example, the user performs operations on the touch sensitive surface 831 or near the touch sensitive surface 831 by using fingers, a stylus, or any suitable object or accessory), and drive the corresponding connected device according to the preset program. Optionally, the touch sensitive surface 831 may include two parts, i.e., a touch detection device and a touch controller, wherein the touch detection device detects a touch orientation of the user and signals caused by the touch operation, and transmits the signals to the touch controller; and the touch controller receives the touch information from the touch detection device, converts the touch information into a contact coordinate and transmits it to the processor 840, and the touch controller can also receive the instruction from the processor 840 and execute the instruction. Additionally, the touch sensitive surface 831 may be achieved by adopting various types, such as a resistive type, a capacitive type, an infrared ray type, and a surface acoustic wave type. Besides the touch sensitive surface 831, the input unit 830 may also include other input devices 832. Particularly, the other input devices 832 may include but not limited to one or more of a physical keyboard, a function key (such as a volume control key, a switch key), a trackball, a mouse and a joystick.

The processor 840 is a control center of the TV set 800. The processor 840 connects respective parts of the entire mobile phone via various interfaces and wirings, and performs various functions of the TV set 800 and processes data so as to wholly monitor the TV, by running or executing the software programs and/or modules within the memory 820 and calling the data stored in the memory 820. Optionally, the processor 840 may include one or more processing cores. For example, the processor 840 may integrate with the application processor and the modem processor, wherein the application processor mainly processes the operation system, the user interface, the application program, etc., and the modem processor mainly processes the wireless communication. It may be appreciated that the modem processor may not be integrated into the processor 840.

The TV set 800 further includes a power supply 850 (such as a battery) for supplying power to respective components. For example, the power supply may be connected to the processor 840 logically via a power management system, so as to achieve the functions of a charge management, a discharge management and a power consumption management by the power management system. The power supply 850 may also include any components, such as one or more direct current or alternative current power supplies, recharging systems, power failure detection circuits, power converters or inverters, and power status indicators.

Although not shown in the drawing, the TV set 800 may also include a camera, a Bluetooth module, and the like, which are not repeated herein. In the present embodiment, the TV set further includes physical control keys within an area of the TV set controllable by hand, a memory and one or more modules. The one or more modules are stored in the memory and configured to make the one or more processors execute the instructions at the TV set side involved in the method for recognizing a logo provided by the embodiment shown in FIG. 2, FIG. 3A or FIG. 4 of the present disclosure.

In addition, typically, the TV set described in the present disclosure does not limit as may include various handheld TV devices, such as a mobile phone, and a personal digital assistant (PDA). Thereby, the protection scope of the present disclosure should not be restricted to any specific type of the TV set but apply to any electronic devices capable of receiving and displaying TV data.

Additionally, the method according to the present disclosure may be implemented as the computer program executed by CPU, and the computer program may be stored in the computer-readable storage medium. When the computer program is executed by the CPU, the above functions defined in the method of the present disclosure are performed.

Furthermore, the above steps in the method and the units in the system may also be realized by using the controller and the computer-readable storage medium which stores the computer program for causing the controller to achieve the above steps or unit functions.

Moreover, it should be understood that the computer-readable storage medium (such as the memory) described in the present disclosure may be a transitory or non-transitory memory, or a combination thereof. As an example and not restrictive, the non-transitory memory may include a read-only memory (ROM), a programmable ROM (PROM), an electrically programmable ROM (EPROM), an electrically erasable programmable ROM (EEPROM), or a flash memory. The transitory memory may include a random access memory (RAM) which can act as an external cache memory. As an example and not restrictive, RAM may be obtained in various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronization link DRAM (SLDRAM), and a direct Rambus RAM (DRRAM). The storage mediums in the aspects of the present disclosure are intended to include, but not limited to, these and any other suitable types of memory.

The person skilled in the art should also understand that the various illustrative logical blocks, modules, circuits and algorithm steps described in combination with the contents disclosed herein may be implemented as an electronic hardware, computer software or a combination thereof. In order to clearly explain the interchangeability between the hardware and the software, a general description has been given in terms of the functions of various illustrative components, blocks, modules, circuits and steps. These functions are implemented as the software or implemented as the hardware depending on the particular applications and the design constraints imposed to the whole system. The person skilled in the art may realize these functions in various manners with respect to each kind of particular application, but this realization should not be interpreted as departing from the scope of the present disclosure.

The various illustrative logical blocks, modules and circuits described in combination with the contents disclosed herein may be realized or executed by the following components which are designed for executing the above functions: a general purpose processor, a digital signal processor (DSP), an application specific IC (ASIC), a field programmable gate array (FPGA), or other programmable logic devices, a discrete gate, or a transistor logic, a discrete hardware element or any combination thereof. The general purpose processor may be a microprocessor. Alternatively, the processor may be any conventional processor, controller, microcontroller or state machine. The processor may also be implemented as a combination of the computing devices, such as a combination of a DSP and a microprocessor, a plurality of microprocessors, one or more microprocessor combined with a DSP core, or any other such configurations.

The steps of the method or algorithm described in combination with the contents disclosed herein may be directly included in the hardware, in the software module executed by the processor, or in a combination thereof. The software module may reside in a RAM, a flash memory, a ROM, an EPROM, an EEPROM, a register, a hard disk, a removable disk, a CD-ROM, or any other storage mediums of any forms known in the art. The exemplary storage medium is coupled to the processor such that the processor can read information from the storage medium or write information into the storage medium. In an alternative solution, the storage medium may be integrated to the processor. The processor and the storage medium may reside in an ASIC. The ASIC may reside in a user terminal. In an alternative solution, the processor and the storage medium may reside in the user terminal as discrete components.

In one or more exemplary designs, the functions may be implemented in hardware, software, firmware, or any combination thereof. If the functions are implemented in software, the functions may be stored in the computer-readable storage medium or may be transmitted by the computer-readable medium as one or more instructions or codes. The computer-readable medium includes a computer storage medium and a communication medium, and the communication medium includes any medium assisting the transmission of the computer program from one place to another place. The storage medium may be any available medium which is able to be accessed by a general purpose or special purpose computer. As an example and not restrictive, the computer-readable medium may include a RAM, a ROM, an EEPROM, a CD-ROM or other optical disc storage mediums, magnetic disc storage mediums or other magnetic storage mediums, or may be any other media which are used to carry or store the desired program codes in the form of instructions or data structures and can be accessed by a general purpose or special purpose computer or a general purpose or special purpose processor. Also, any linking may be properly referred to as the computer-readable medium. For example, if sending the software from a website, a server, or other remote sources by a coaxial cable, a fiber optic cable, a twisted pair, a digital subscriber line (DSL), or a wireless technology such as an infrared, a radio and a microwave technologies, the above coaxial cable, fiber optic cable, twisted pair, DSL, or wireless technology such as the infrared, the radio and the microwave technologies are included in the definition of the media. As used herein, the magnetic disc and the optical disc include a compact disc (CD), a laser disc, an optical disc, a digital versatile disc (DVD), a floppy disc and a blu-ray disc, wherein the magnetic disc usually reproduces data magnetically, while the optical disc reproduces data optically with lasers. The combinations of the above contents should also be included within the scope of the computer-readable medium.

Although the exemplary embodiments of the present disclosure are illustrated in the above contents, it should be noted that various changes and modifications may be made to the disclosed exemplary embodiments without departing from the scope of the present disclosure as defined in the claims. The functions, steps and/or actions in the method claim according to the disclosed embodiments described herein need not be performed in any specific order. In addition, although the elements of the present disclosure may be described or claimed in the individual form, they can also be conceived to be more unless they are explicitly restricted to be singular.

It should be understood that in the present disclosure, unless the exceptional case in which the context clearly gives supports, the singular forms "a", "an", and "the" are intended to include the plural forms. It should also be appreciated that the expression "and/or" used herein indicates including any and all possible combinations of one or more of the associated listed items.

The serial numbers of the aforementioned embodiments in the present disclosure are only for illustrative purpose, not showing the superiority or inferiority of the embodiments.

The person skilled in the art can understand that the whole or part of the steps for achieving the above-described embodiments can be accomplished by hardware, or be accomplished by a program instructing relevant hardware, the program may be stored in a computer readable storage medium, and the above-mentioned storage medium may be a read-only memory, a magnetic disc or an optical disc, etc.

The above contents are only exemplary embodiments of the present disclosure, but are not intended to limit the present disclosure. Any modifications, equivalent replacements, improvements and the like made within the spirit and principles of the present disclosure should be included in the protection scope of the present disclosure.

What is claimed is:

1. A method for recognizing a TV station logo, comprising:
- receiving position information of opaque portions of a standard TV station logo from a server, the position information being obtained in a coordinate system;
- obtaining a TV screen image;
- for each pre-stored standard TV station logo, selecting, according to the position information of the opaque portions of the standard TV station logo, an area from the TV screen image as a matching area of the opaque portions of the standard TV station logo;
- converting a color space of the TV screen image into a converted color space in which luminance and chrominance of the TV screen image are separated;
- for each standard TV station logo, calculating a difference between a luminance value of each pixel in the opaque portions of the standard TV station logo and a luminance value of a corresponding pixel in the matching area, wherein calculating comprises:
  - for each pixel in the opaque portions of the standard TV station logo, detecting whether the luminance value of the pixel is 0; and
  - if the luminance value of the pixel is not 0, calculating the difference between the luminance value of the pixel and the luminance value of the corresponding pixel in the matching area;
- summing the differences for all the calculated pixels in the opaque portions of the standard TV station logo so as to obtain a matching value; and
- determining the TV station logo in the TV screen image according to the standard TV station logo with a minimum matching value.

2. The method according to claim 1, wherein the method further comprises:
- obtaining a matching threshold value for the standard TV station logo with the minimum matching value, the matching threshold value being positively correlated with a size of the standard TV station logo;
- comparing the minimum matching value with the matching threshold value;
- if the minimum matching value is larger than the matching threshold value, sending the TV screen image to a server; and
- if the minimum matching value is less than the matching threshold value, using the standard TV station logo with the minimum matching value as the TV station logo in the TV screen image.

3. The method according to claim 1, wherein the method further comprises:
- detecting whether basic information of the standard TV station logo stored in a server is updated, the basic information comprising feature information of the standard TV station logo and the position information of the standard TV station logo, or further comprising a matching threshold value of the standard TV station logo; and
- if it is detected that the basis information is updated, downloading the basic information of the standard TV station logo from the server and updating the same.

4. The method according to claim 3, wherein downloading comprises:
- sending local region information to the server; and
- receiving the basic information of at least one standard TV station logo from the server, which is provided based on the local region information.

5. The method according to claim 1, wherein the method further comprises:
- recording continuous n recognition results of a channel corresponding to the TV screen image, wherein n>1;
- detecting whether there are the same more than m recognition results in the continuous n recognition results, wherein $1 \leq m < n$; and
- if there are the same more than m recognition results, selecting the same recognition result as a correct recognition result, and correlating the correct recognition result with the channel.

6. The method according to claim 5, wherein the method further comprises:
- replacing an earliest recognition result in the continuous n recognition results by a latest recognition result of the channel corresponding to the TV screen image;
- re-detecting whether there are the same more than m recognition results in the continuous n recognition results;
- if there are the same more than m recognition results, continuing to detect whether this same recognition result is the same as the last correct recognition result; and
- if the same recognition result is not the same as the last correct recognition result, taking the same recognition result detected this time as a new correct recognition result.

7. A TV set, comprising:
- one or more processors;
- a TV screen and a memory, wherein the processor is configured to execute instructions for:
- receiving position information of opaque portions of a standard TV station logo from a server, the position information being obtained in a coordinate system;
- obtaining a TV screen image;
- for each pre-stored standard TV station logo, selecting, according to the position information of the opaque portions of the standard TV station logo, an area from the TV screen image as a matching area of the opaque portions of the standard TV station logo;
- converting a color space of the TV screen image into a converted color space in which luminance and chrominance of the TV screen image are separated;
- for each standard TV station logo, calculating a difference between a luminance value of each pixel in the opaque portions of the standard TV station logo and a luminance value of a corresponding pixel in the matching area, wherein calculating comprises:
  - for each pixel in the opaque portions of the standard TV station logo, detecting whether the luminance value of the pixel is 0; and
  - if the luminance value of the pixel is not 0, calculating the difference between the luminance value of the pixel and the luminance value of the corresponding pixel in the matching area;
- summing the differences for all the calculated pixels in the opaque portions of the standard TV station logo so as to obtain a matching value; and
- determining the TV station logo in the TV screen image according to the standard TV station logo with a minimum matching value.

8. The TV set according to claim 7, wherein the processor is further configured to execute instructions for:
- obtaining a matching threshold value for the standard TV station logo with the minimum matching value, the matching threshold value being positively correlated with a size of the standard TV station logo;

comparing the minimum matching value with the matching threshold value;

if the minimum matching value is larger than the matching threshold value, sending the TV screen image to a server; and if the minimum matching value is less than the matching threshold value, using the standard TV station logo with the minimum matching value as the TV station logo in the TV screen image.

9. The TV set according to claim 7, wherein the processor is further configured to execute instructions for:

detecting whether basic information of the standard TV station logo stored in a server is updated, the basic information comprising feature information of the standard TV station logo and the position information of the standard TV station logo, or further comprising a matching threshold value of the standard TV station logo; and if it is detected that the basis information is updated, downloading the basic information of the standard TV station logo from the server and updating the same.

10. The TV set according to claim 9, wherein downloading comprises:

sending local region information to the server; and receiving the basic information of at least one standard TV station logo from the server, which is provided based on the local region information.

11. The TV set according to claim 7, wherein the processor is further configured to execute instructions for:

recording continuous n recognition results of a channel corresponding to the TV screen image, wherein n>1;

detecting whether there are the same more than m recognition results in the continuous n recognition results, wherein 1≤m<n; and if there are the same more than m recognition results, selecting the same recognition result as a correct recognition result, and correlating the correct recognition result with the channel.

12. The TV set according to claim 11, wherein the processor is further configured to execute instructions for:

replacing an earliest recognition result in the continuous n recognition results by a latest recognition result of the channel corresponding to the TV screen image;

re-detecting whether there are the same more than m recognition results in the continuous n recognition results;

if there are the same more than m recognition results, continuing to detect whether this same recognition result is the same as the last correct recognition result; and if the same recognition result is not the same as the last correct recognition result, taking the same recognition result detected this time as a new correct recognition result.

13. A non-transitory computer-readable storage medium having stored therein instructions that, when executed by one or more processors of a TV set, cause the TV set to perform:

receiving position information of opaque portions of a standard TV station logo from a server, the position information being obtained in a coordinate system;

obtaining a TV screen image;

for each pre-stored standard TV station logo, selecting, according to the position information of the opaque portions of the standard TV station logo, an area from the TV screen image as a matching area of the opaque portions of the standard TV station logo;

converting a color space of the TV screen image into a converted color space in which luminance and chrominance of the TV screen image are separated;

for each standard TV station logo, calculating a difference between a luminance value of each pixel in the opaque portions of the standard TV station logo and a luminance value of a corresponding pixel in the matching area, wherein calculating comprises:

for each pixel in the opaque portions of the standard TV station logo, detecting whether the luminance value of the pixel is 0; and if the luminance value of the pixel is not 0, calculating the difference between the luminance value of the pixel and the luminance value of the corresponding pixel in the matching area;

summing the differences for all the calculated pixels in the opaque portions of the standard TV station logo so as to obtain a matching value; and determining the TV station logo in the TV screen image according to the standard TV station logo with a minimum matching value.

* * * * *